US008787052B2

(12) United States Patent
O'Brien et al.

(10) Patent No.: US 8,787,052 B2
(45) Date of Patent: Jul. 22, 2014

(54) METHODS AND SYSTEMS FOR CONTROLLING A POWER CONVERSION DEVICE

(75) Inventors: Kathleen Ann O'Brien, Niskayuna, NY (US); Owen Jannis Schelenz, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 261 days.

(21) Appl. No.: 13/324,436

(22) Filed: Dec. 13, 2011

(65) Prior Publication Data

US 2013/0148394 A1 Jun. 13, 2013

(51) Int. Cl.
*H02M 7/537* (2006.01)

(52) U.S. Cl.
USPC .............................. 363/95; 323/207; 323/906

(58) Field of Classification Search
USPC ........... 363/95, 97, 98; 323/207, 906; 702/60, 702/65; 700/298
See application file for complete search history.

(56) References Cited

U.S. PATENT DOCUMENTS

| 5,708,590 | A | 1/1998 | Slutsker et al. | |
| 6,603,290 | B2 * | 8/2003 | Hochgraf | 322/37 |
| 7,804,184 | B2 | 9/2010 | Yuan et al. | |
| 8,295,063 | B2 * | 10/2012 | Gong et al. | 363/40 |
| 2006/0162772 | A1 * | 7/2006 | Presher et al. | 136/290 |
| 2009/0177333 | A1 * | 7/2009 | Delmerico et al. | 700/297 |
| 2010/0138061 | A1 | 6/2010 | Walling et al. | |
| 2010/0142237 | A1 * | 6/2010 | Yuan et al. | 363/97 |
| 2012/0280673 | A1 * | 11/2012 | Watanabe et al. | 323/304 |

FOREIGN PATENT DOCUMENTS

| EP | 1841037 A2 | 10/2007 |
| EP | 2551984 A2 | 1/2013 |

OTHER PUBLICATIONS

David W. Johnson, EGR 325, Electromechanics Technical Paper 2, The Transformer Equivalent Circuit from Experiment #9, Grand Valley State University, Padnos School of Engineering, Apr. 17, 2000, 5 pages.

* cited by examiner

*Primary Examiner* — Harry Behm
(74) *Attorney, Agent, or Firm* — Paul J. DiConza

(57) ABSTRACT

A power conversion system configured to provide alternating current (AC) power to a transformer is described. The power conversion system includes a power conversion device that includes a device input and a device output. The power conversion device is configured to receive power from a power source at the device input and the device output is configured for coupling to a transformer input. The power conversion system also includes a sensor coupled at a first point of interconnection between the device output and the transformer input and is configured to measure a voltage level at the first point of interconnection. The power conversion system also includes a system controller communicatively coupled to the power conversion device and the sensor. The system controller is configured to determine an impedance of the power grid based at least partially on the voltage level at the first point of interconnection.

15 Claims, 4 Drawing Sheets

METHODS AND SYSTEMS FOR CONTROLLING A POWER CONVERSION DEVICE

BACKGROUND OF THE INVENTION

The embodiments described herein relate generally to control of a power generation system coupled to a power grid, and more specifically, to monitoring an impedance of the power grid during operation of the power generation system.

Solar energy has increasingly become an attractive source of energy and has been recognized as a clean, renewable alternative form of energy. Solar collector systems utilize a plurality of photovoltaic (PV) arrays to convert solar energy incident on the PV arrays into direct current (DC) power. Typically, the DC output of the PV arrays is coupled to a DC to alternating current (AC) inverter to convert the DC output of the PV arrays into a suitable AC waveform that can be fed to a power grid. Furthermore, the AC output of the DC to AC inverter may be provided to a transformer that increases the voltage of the AC power prior to applying the AC power to the power grid.

The AC power applied to the power grid is required to meet grid connectivity expectations. These requirements address safety issues as well as power quality concerns. The Institute of Electrical and Electronics Engineers (IEEE) has written a standard that addresses grid-connected distributed generation including renewable energy systems (IEEE 1547-2003). Underwriters Laboratories (UL) has also developed a standard, UL 1741, to certify inverters, converters, charge controllers, and output controllers for power-producing stand-alone and grid-connected renewable energy systems. UL 1741 verifies that inverters comply with IEEE 1547 for grid-connected applications.

Furthermore, a grid-connected PV power generation system may include low voltage ride through (LVRT), voltage regulation, and power factor correction capabilities. To support the grid voltage, the DC to AC inverter may also deliver reactive power to the power grid. Typically, a voltage level at a point of interconnection between the transformer and the power grid is measured, and the output of the DC to AC inverter is controlled based on the voltage level at that point of interconnection. However, this point of interconnection is not always accessible, or may not be accessible in an economical manner, and therefore, measuring the voltage level at the point of interconnection between the transformer and the power grid may be difficult or impossible.

BRIEF DESCRIPTION OF THE INVENTION

In one aspect, a power conversion system configured to provide alternating current (AC) power to a transformer is provided. A transformer input is coupled to the power conversion system and a transformer output is coupled to a power grid. The power conversion system includes a power conversion device that includes a device input and a device output. The power conversion device is configured to receive power from a power source at the device input and the device output is configured for coupling to the transformer input. The power conversion system also includes a sensor coupled at a first point of interconnection between the device output and the transformer input and is configured to measure a voltage level at the first point of interconnection. The power conversion system also includes a system controller coupled to the power conversion device and the sensor. The system controller is configured to determine an impedance of the power grid based at least partially on the voltage level at the first point of interconnection.

In another aspect, a power generation system is provided. The generation system includes a power source and a power conversion device. The power conversion device includes a device input and a device output, wherein the device input is coupled to the power source. The power generation system also includes a transformer having a transformer input and a transformer output, wherein the transformer input is coupled to the device output at a first point of interconnection and wherein the transformer output is coupled to a power grid at a second point of interconnection. The power generation system also includes at least one sensor positioned between the power conversion device and the transformer and configured to measure a voltage level at the first point of interconnection. The power generation system also includes a system controller coupled to the power conversion device and the at least one sensor and configured to determine an impedance of the power grid based at least partially on the voltage level at the first point of interconnection.

In yet another aspect, a method for controlling operation of a power conversion device included within a power conversion system is provided. A power source provides power to the power conversion device which provides power to a transformer at a first point of interconnection. The transformer is coupled to the power grid at a second point of interconnection and at least one sensor is coupled between the power conversion device and the transformer. The method includes varying a reactive current output of the power conversion device and receiving a sensor signal from the at least one sensor. The sensor signal includes data associated with a voltage level at the first point of interconnection. The method also includes determining an impedance of the power grid at the second point of interconnection based at least partially on a measured change in voltage in response to the varied reactive power. The method also includes controlling operation of the power conversion device based on the impedance of the power grid.

DETAILED DESCRIPTION OF THE INVENTION

The methods, systems, and computer readable media described herein facilitate controlling operation of a power conversion device based at least partially on an impedance at a point of interconnection between the device and a power grid. At least one of a magnitude of reactive power output by the device and provided to the power grid and a rate of increase of the reactive power are based at least partially on a strength of the power grid.

Technical effects of the methods, systems, and computer-readable media described herein include at least one of: (a) varying a reactive current output of a power conversion device; (b) receiving a sensor signal that includes data associated with a voltage level at a first point of interconnection within the power generation system; (c) determining an impedance of the power grid at a second point of interconnection based at least partially on a measured change in voltage in response to the varied reactive power; and (d) controlling operation of the power conversion device based on the impedance of the power grid.

Figure 1:
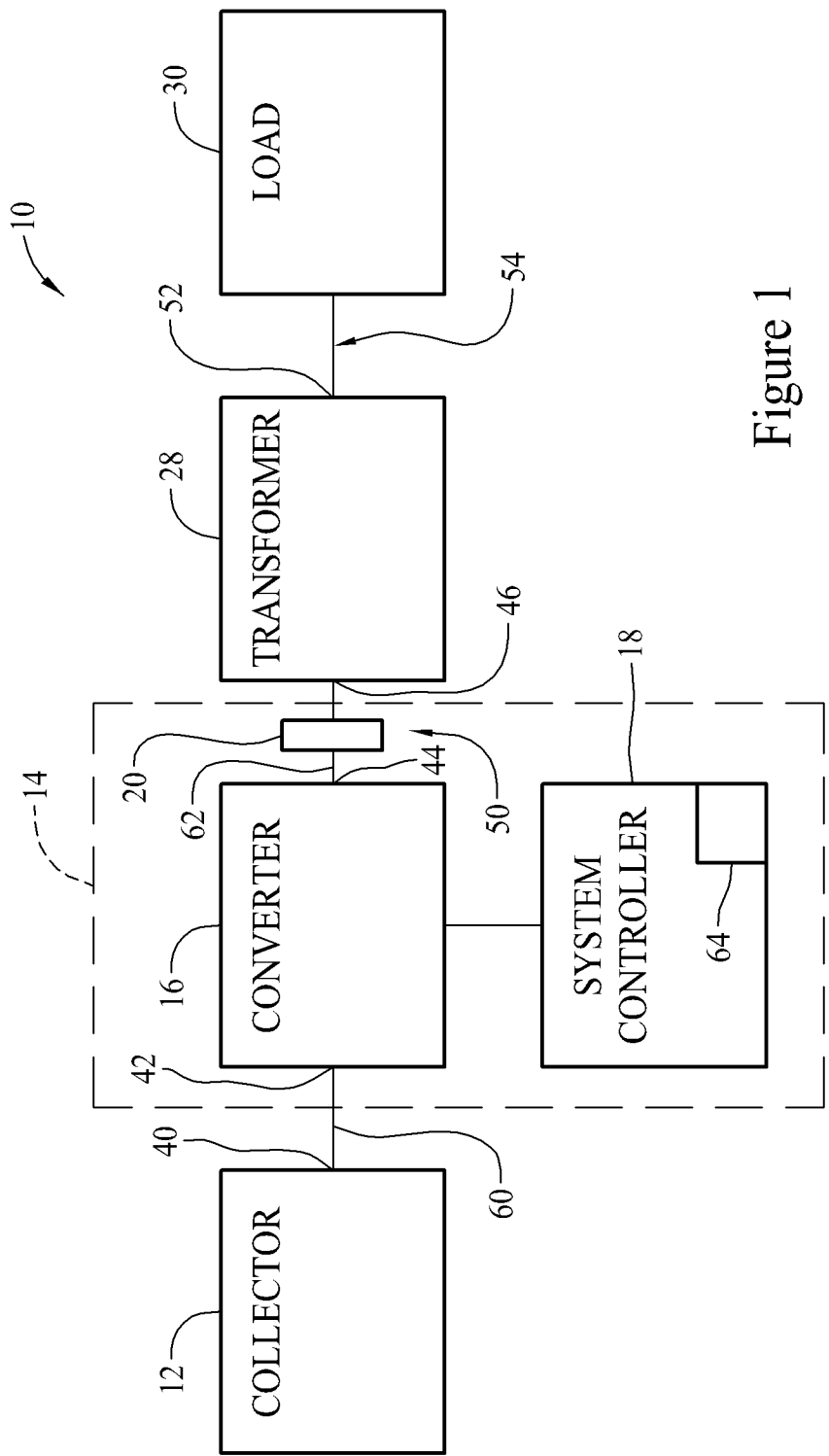
FIG. 1 is a block diagram of a power generation system.

FIG. 1 is a block diagram of an exemplary power generation system 10. In the exemplary embodiment, power generation system 10 includes a power source 12, for example, but not limited to, a photovoltaic (PV) collection device 12. In the exemplary embodiment, power generation system 10 also includes a power conversion system 14 that includes a power conversion device 16, a system controller 18, and at least one sensor 20. In the exemplary embodiment, power conversion device 16 is coupled between power source 12 and a transformer 28. Transformer 28 is coupled between power conversion device 16 and a load, for example, but not limited to, a power grid 30. More specifically, an output 40 of collection device 12 is coupled to an input 42 of power conversion device 16. Furthermore, an output 44 of power conversion device 16 is coupled to an input 46 (i.e., low-voltage side) of transformer 28 at a first point of interconnection 50. An output 52 (i.e., high-voltage side) of transformer 28 is coupled to power grid 30 at a second point of interconnection 54.

As referred to herein, power grid 30 is a network of conductors and devices configured for distribution and/or transmission of electricity. Transformer 28 may include, but is not limited to including, a step-up transformer, an isolation transformer, and/or any other type of transformer within a distribution/transmission network. Transformer 28 receives power from conversion device 16, increases a voltage level of the power, and applies it to power grid 30. Typically, collection device 12 includes a plurality of PV module strings coupled, for example, by a DC switch gear (not shown in FIG. 1), that collects DC voltages from the PV module strings and outputs a DC voltage 60. DC voltage 60 is provided to power conversion device 16. In the exemplary embodiment, power conversion device 16 is a DC to AC voltage inverter configured to convert DC voltage 60 to an AC voltage 62, for example, a three-phase AC voltage, which is provided to power transformer 28.

In an alternative embodiment, AC power is provided to power conversion device 16. In the alternative embodiment, power conversion device 16 is an AC to AC converter, which converts the received AC power to an AC power having a frequency and voltage that is suitable for injection onto power grid 30. Although described herein with respect to a PV collection system, power conversion system 16 may be included within wind-power systems, energy storage systems, and/or any other type of power system that includes a grid tied converter with reactive power capabilities.

In the exemplary embodiment, system controller 18 includes, or is coupled to, a memory device 64. System controller 18 is included within, or is coupled to, conversion device 16 and is configured to control operation of conversion device 16. For example, system controller 18 may generate a conversion device control signal and provide the conversion device control signal to conversion device 16. Conversion device 16 operates in accordance with the conversion device control signal.

In the exemplary embodiment, power conversion system 14 provides closed-loop control of reactive power output by conversion device 16. More specifically, conversion device 16, system controller 18, and sensor 20 are coupled in a closed-loop configuration. Sensor 20 (e.g., a transducer) measures at least one of a voltage level and a current level at first point of interconnection 50 and transmits a corresponding signal to system controller 18. System controller 18 generates a conversion device control signal based at least partially on the signal from sensor 20 and transmits the conversion device control signal to conversion device 16. Conversion device 16 operates in accordance with the inverter control signal, which affects the output of conversion device 16, which is measured by sensor 20.

In the exemplary embodiment, power conversion system 14 regulates the voltage level at second point of interconnection 54 (i.e., the high-voltage side of transformer 28). As described above, in many situations, second point of interconnection 54 is inaccessible, and therefore, directly measuring the voltage level at second point of interconnection 54 is difficult or impossible. For example, a utility may not allow access to second point of interconnection 54. In other situations, a cost of installation of power conversion system 14 may be reduced if a sensor is not coupled to second point of interconnection 54. Simply collecting data from first point of interconnection 50 will not provide system controller 18 with enough information to determine the voltage level at second point of interconnection 54. The impedance seen by conversion device 16 attributable to transformer 28 may be stored, for example, in memory device 64 during installation of power conversion system 14. However, the impedance seen by conversion device 16 is also affected by the impedance of power grid 30.

In the exemplary embodiment, memory device 64 also stores an equivalent power system model that describes the effect of transformer 28 and power grid 30 on conversion device 16. The equivalent power system model includes at least one impedance parameter that is dependent upon recent information, for example, a measurement from sensor 20 and/or a signal from system controller 64. The equivalent power system model may include a transformer model that includes at least one transformer parameter that describes operation of transformer 28. In the exemplary embodiment, the transformer model is a predetermined mathematical model representing operation of transformer 28. More specifically, the transformer model allows system controller 18 to estimate the voltage level at second point of interconnection 54 when given the voltage level at first point of interconnection 50. For example, memory device 64 may store transformer models for a plurality of different transformers and/or types of transformers, and/or for a plurality of different transformer configurations. The type and/or configuration of transformer 28 is provided to system controller 18, for example, during commissioning (i.e., installation) of power conversion system 14 and/or transformer 28.

Alternatively, a specific transformer model is selected, for example, by a user, during installation and/or setup of system controller 18. For example, during commissioning, a user may input nameplate information from transformer 28 into system controller 18. The nameplate information may include, but is not limited to including, a configuration of transformer 28 (e.g., delta-delta, delta-wye), and/or an impedance (e.g., % Z) of transformer 28. System controller 18 uses the transformer model to estimate the voltage level at second point of interconnection 54 when provided the voltage level at first point of interconnection 50 by, for example, sensor 20. To regulate the voltage level at second point of interconnection 54, system controller 18 controls the reactive power output of conversion device 16, which when applied to power grid 30 at transformer output 52, influences the voltage level at second point of interconnection 54.

In the exemplary embodiment, system controller 18 determines an impedance of power grid 30. For example, system controller 18 may determine the grid impedance continuously, periodically, or sporadically, during operation of power conversion system 14. Determining the grid impedance is referred to herein as an impedance meter function of power conversion system 14. The impedance meter function allows conversion device 16 to sense terminal characteristics at first point of interconnection 50, which when combined with stored impedance characteristics of transformer 28, allow system controller 18 to determine the grid impedance at second point of interconnection 54.

In the exemplary embodiment, to determine the grid impedance, system controller 18 directs conversion device 16 to apply various levels of reactive current to transformer 28. Sensor 20 measures the voltage level at first point of interconnection 50 for each level of reactive current applied to transformer 28. System controller 18 uses the changes in the voltage level to determine the impedance seen by conversion device 16 at first point of interconnection 50. For example, if the grid impedance is relatively low (i.e., the grid is relatively strong), a predefined change in the reactive current applied to transformer 28 will cause the voltage level at first point of interconnection 50 to change a first amount. If the grid impedance is relatively high (i.e., the grid is relatively weak), the predefined change in the reactive current applied to transformer 28 will cause the voltage level at first point of interconnection 50 to change a second amount, wherein the second amount is greater than the first amount. In other words, system controller 18 can detect that the grid impedance is relatively high (i.e., the grid is relatively weak) when the predefined change in reactive current causes a relatively large change in the voltage level at first point of interconnection 50.

In the exemplary embodiment, system controller 18 determines when the impedance meter function of power conversion system 14 may be performed without negatively effecting operation of power conversion system 14. For example, if power grid 30 is weak, adding the reactive current used to determine the grid impedance to power grid 30 may cause the voltage output of conversion device 16 to exceed a predefined level, for example, a voltage level that would cause protective devices included within power conversion system 14 to trip. Furthermore, if conversion device 16 is conditioning power at a maximum power capacity of conversion device 16, conversion device 16 does not have the capacity to perform the impedance meter function. In the exemplary embodiment, system controller 18 performs the impedance meter function as often as possible in order to base the current regulation determinations on recent grid impedance measurements.

In the exemplary embodiment, system controller 18 determines the grid impedance at second point of interconnection 54 by subtracting the impedance of transformer 28 from the impedance seen by conversion device 16 at first point of interconnection 50. For example, a % Z of transformer 28 may be from, for example, approximately 3% to 8%, and more specifically, may be approximately 5%. In other words, system controller 18 senses the impedance of power grid 30 based on terminal characteristics at first point of interconnection 50.

In an alternative embodiment, system controller 18 determines the grid impedance based on a change in the voltage level at first point of interconnection 50 caused by a change in power provided by power source 12. For example, a substantial change in the power provided by power source 12, in the case of a PV power source, may be caused by increasing or decreasing cloud cover. If conversion device 16 passes the higher available power to output 44, the power fluctuation may affect the voltage measured by sensor 20 and provide system controller 18 with information about the equivalent power system model. As described above, system controller 18 uses the changes in the voltage level measured by sensor 20 to determine the impedance seen by conversion device 16 at first point of interconnection 50.

The grid impedance is applied to the conversion device control algorithm, thereby regulating the voltage level at second point of interconnection 54 (i.e., the high-voltage side of transformer 28) using only data and parameters collected at first point of interconnection 50 (i.e., the low-voltage side of transformer 28).

As described above, in the exemplary embodiment, system controller 18 includes memory device 64 that stores a conversion device control algorithm which generates the conversion device control signal. The conversion device control algorithm may include a parameter (e.g., a gain) that is dependent upon a strength of power grid 30. By changing this parameter, a response of conversion device 16 to a measured change in voltage and/or current at first point of interconnection 50 is dependent upon the strength of power grid 30. For example, a magnitude of a response to a measured change may be adjusted dependent upon the strength of power grid 30 so as to not exceed predetermined reactive power levels when the grid strength is low. More specifically, increasing the reactive power applied to power grid 30 when power grid 30 is weak causes a larger voltage change than if power grid 30 was strong. Therefore, when power grid 30 is weak, a gain within the conversion device control algorithm is set such that the algorithm outputs a softer addition of reactive power to power grid 30 so as to prevent a sudden change in the voltage at second point of interconnection 50. When power grid 30 is strong, a stronger (i.e., more rapid) increase in reactive power may be provided to power grid 30 without causing a sudden change in the voltage at second point of interconnection 50.

In the exemplary embodiment, system controller 18 also stores a control algorithm parameter value and an associated time-stamp in memory device 64. More specifically, control algorithm parameter values and associated time-stamps are stored to facilitate monitoring changes in the values over time. For example, a gain determined by system controller 18 on a first date at a first time may be stored in memory device 64. System controller 18 may access the stored gain and use it as a reference, for example, after converter 16 is waking after a trip or after being shut down. The stored time-stamped gain provides a baseline value that system controller 18 can use presently as a starting point, that is, a gain to apply to current operation of power conversion system 14 that was determined as suitable at a similar date and/or time in the past.

Figure 2:
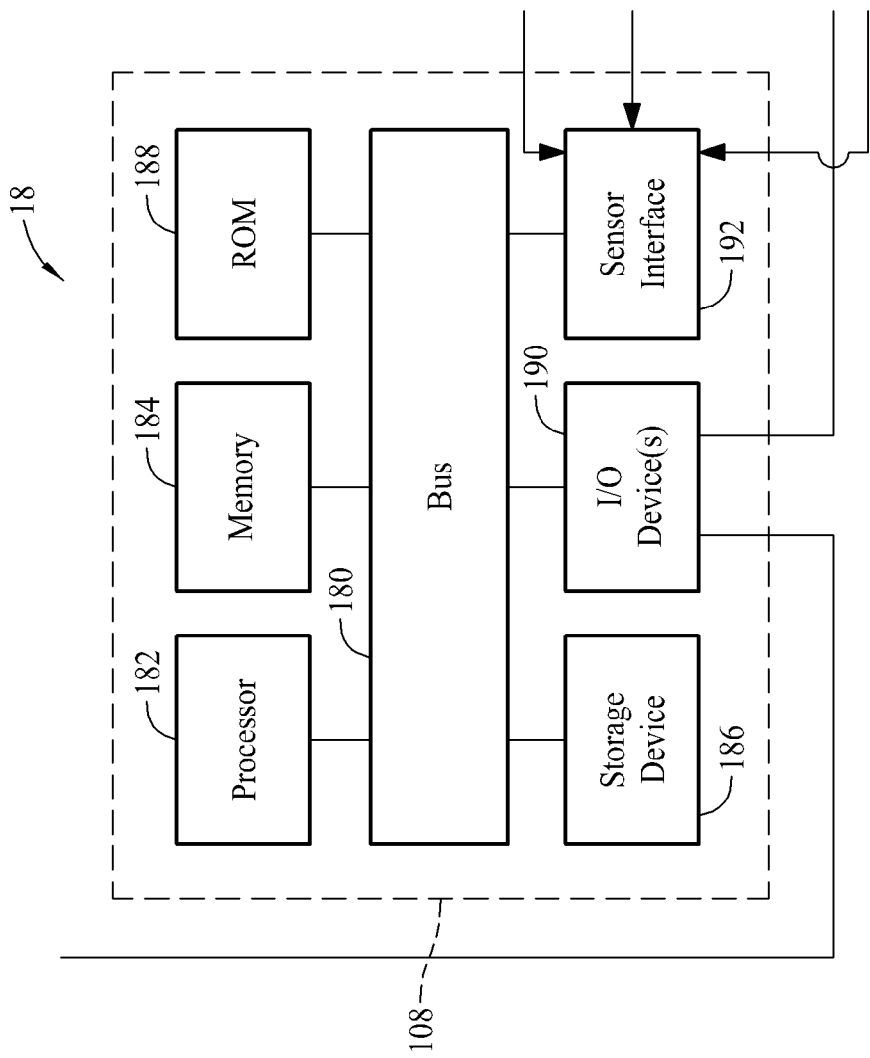
FIG. 2 is a block diagram of an exemplary system controller that may be included within the power generation system shown in FIG. 1.

FIG. 2 is a block diagram of an exemplary embodiment of system controller 18 (shown in FIG. 1). In some embodiments, system controller 18 includes a bus 180 or other communications device to communicate information. One or more processor(s) 182 are coupled to bus 180 to process information, including information from sensors included in PV collector unit 12 and from sensor 20. Processor(s) 182 may include at least one computer. As used herein, the term computer is not limited to integrated circuits referred to in the art as a computer, but broadly refers to a processor, a microcontroller, a microcomputer, a programmable logic controller (PLC), an application specific integrated circuit (ASIC), and other programmable circuits, and these terms are used interchangeably herein. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art.

In the exemplary embodiment, memory device 64, which is included in, or coupled to, system controller 18, may include one or more random access memories (RAM) 184 and/or other storage device(s) 186. RAM(s) 184 and storage device(s) 186 are coupled to bus 180 to store and transfer information and instructions to be executed by processor(s) 182. RAM(s) 184 (and/or storage device(s) 186, if included) can also be used to store temporary variables or other intermediate information during execution of instructions by processor(s) 182. System controller 18 may also include one or more read only memories (ROM) 188 and/or other static storage devices coupled to bus 180 to store and provide static (i.e., non-changing) information and instructions to processor(s) 182. Processor(s) 182 process information transmitted from a plurality of electrical and electronic devices that may include, without limitation, irradiance sensors and power meters. Instructions that are executed include, without limitation, resident conversion and/or comparator algorithms. The execution of sequences of instructions is not limited to any specific combination of hardware circuitry and software instructions.

System controller 18 may also include, or may be coupled to, input/output device(s) 190. Input/output device(s) 190 may include any device known in the art to provide input data to system controller 18 and/or to provide outputs, such as, but not limited to, conversion device control outputs. Instructions may be provided to RAM 184 from storage device 186 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 190 may include, without limitation, computer peripherals associated with an operator interface (e.g., a human machine interface (HMI)) such as a mouse and a keyboard (neither shown in FIG. 2).

Furthermore, in the exemplary embodiment, additional output channels may include, for example, an operator interface monitor and/or alarm device (neither shown in FIG. 2). System controller 18 may also include a sensor interface 192 that allows system controller 18 to communicate with sensors, for example, sensor 20. Sensor interface 192 may include one or more analog-to-digital converters that convert analog signals into digital signals that can be used by processor(s) 182. System controller 18 may also be coupled to, or included within, a supervisory control system, for example, but not limited to, a supervisory control and data acquisition (SCADA) system, for example, a SCADA associated with a utility company, and/or a substation or network controller.

Figure 3:
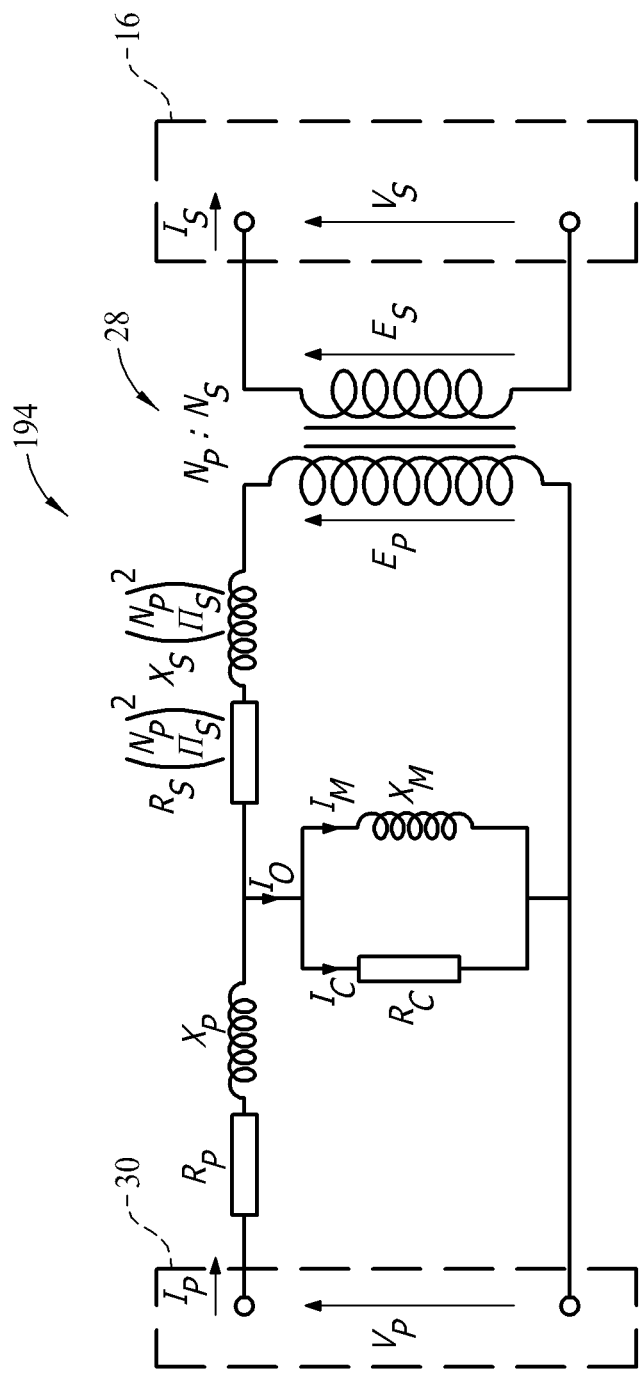
FIG. 3 is an equivalent circuit model of the transformer shown in FIG. 1.

FIG. 3 is an equivalent circuit model 194 of a transformer, for example, transformer 28 (shown in FIG. 1). More specifically, equivalent circuit model 194 models a non-ideal transformer, with all parameters positioned on the primary side of the ideal transformer. A series resistance (Rs) is a resistance of the winding included within transformer 28. A series inductance (Xs) accounts for flux leakage (i.e., a small amount of flux that travels through the air outside the magnetic core path). A parallel resistance (Rc) represents a core loss of the magnetic core material within transformer 28 caused by hysteresis. A parallel inductance (Xm), also referred to as a magnetizing inductance, accounts for the finite permeability of the magnetic core.

Conversion device 16 regulates a voltage level (Vs) (i.e., the voltage level at first point of interconnection 50 (shown in FIG. 1) by interacting with the reactive component of the transformer equivalent impedance. If Xm is negligible, and the impedance of power grid 30 is low, the reactive component of the transformer equivalent impedance is Xp+Xs. Power grid 30 may be defined as a strong grid when, for example only, a short circuit current ratio is greater than approximately 2.5. The impedance of power grid 30 increases as the strength of the grid decreases. Therefore, in some circumstances, transformer 28 is not the only source of impedance that influences operation of conversion device 16. A load (not shown in FIG. 3) connected to power grid 30 may change the transformer equivalent impedance used by system controller 18 to estimate the voltage level at second point of interconnection 54. As described above, system controller 18 may determine the impedance of power grid 30. By correlating a voltage variation due to injected reactive current, system controller 18 can calculate the actual transformer equivalent impedance, including the impedance of power grid 30, seen by conversion device 16. Updating this derived value allows conversion device 16 to more effectively contribute to the stability of power grid 30 when conversion device 16 has excess capacity to produce reactive power.

Figure 4:
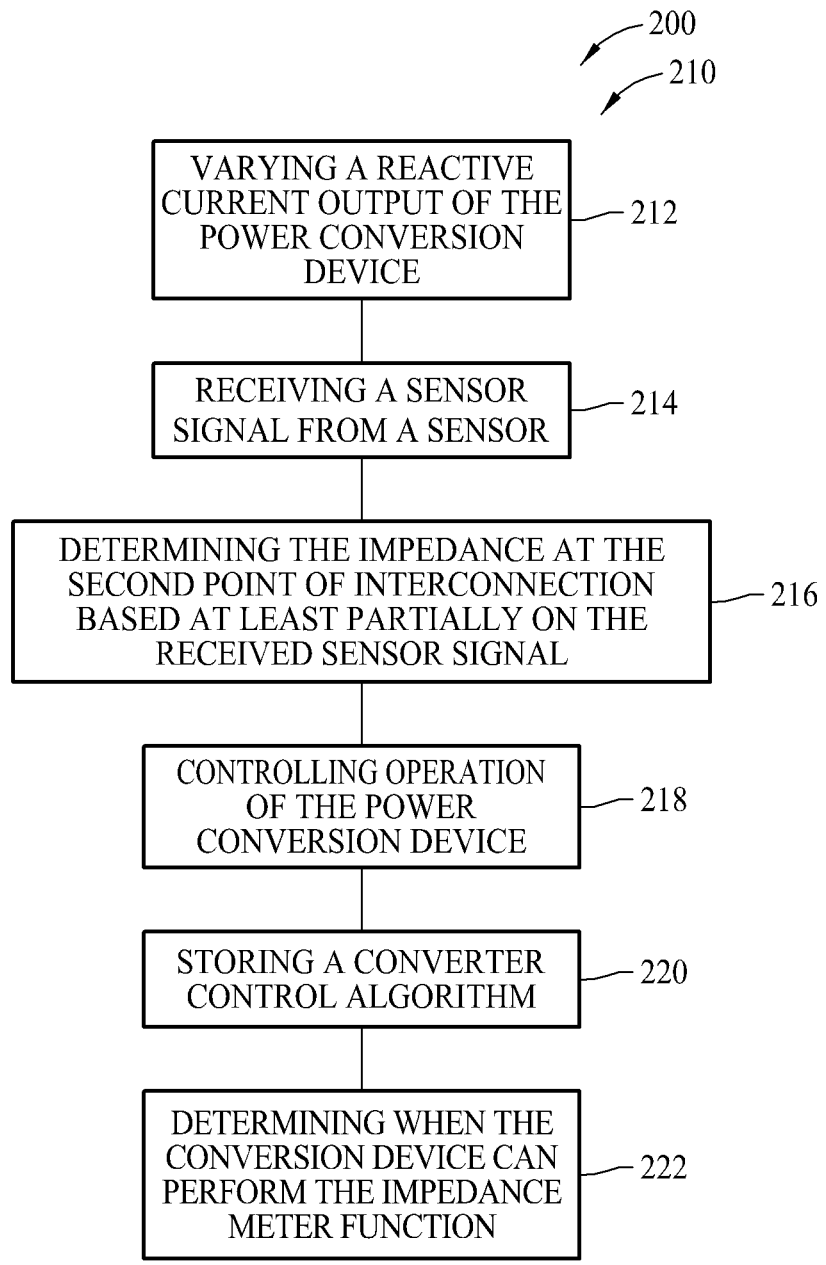
FIG. 4 is a flow chart of an exemplary method for controlling operation of the power conversion device included within the power generation system shown in FIG. 1.

FIG. 4 is a flow chart 200 of an exemplary method 210 for controlling operation of a conversion device included within a power conversion system, for example, conversion device 16 included within power conversion system 14 (shown in FIG. 1). In an exemplary embodiment, method 210 is a computer-implemented method, for example, a computer-implemented method executed by system controller 18 (shown in FIG. 1). In another exemplary embodiment, a computer program embodied on a computer readable medium includes at least one code segment, that when executed by a computer or processor, for example, system controller 18, performs method 210. Aspects of the invention transform a general-purpose computer into a special-purpose computing device when configured to execute the instructions described herein.

As described above, a power source, for example, power source 12 (shown in FIG. 1), provides power to conversion device 16 which is controlled by a system controller, for example, system controller 18 (shown in FIG. 1). Conversion device 16 provides power to a transformer, for example, transformer 28, at a first point of interconnection, for example, first point of interconnection 50. Furthermore, transformer 28 is coupled to a power grid at a second point of interconnection, for example, power grid 30 at second point of interconnection 54 (shown in FIG. 1). Moreover, at least one sensor, for example, sensor 20, is coupled between conversion device 16 and transformer 28.

In the exemplary embodiment, method 210 includes varying 212 a reactive current output of conversion device 16. Method 210 also includes receiving 214 a sensor signal from sensor 20, wherein the sensor signal includes data associated with a voltage level at first point of interconnection 50. Method 210 also includes determining 216 an impedance of power grid 30 at second point of interconnection 54 based at least partially on a measured change in voltage in response to the varied reactive current. For example, system controller 18 may determine 216 the impedance of power grid 30 periodically during operation of power conversion system 14.

In the exemplary embodiment, method 210 also includes controlling 218 operation of conversion device 16 based on the impedance of power grid 30. In the exemplary embodiment, system controller 18 generates a conversion device control signal based on the received sensor signal and the transformer model, and provides the conversion device control signal to conversion device 16. Conversion device 16 operates in accordance with the conversion device control signal to output a requested reactive current. Method 210 may also include storing 220 a converter control algorithm that includes a gain parameter based at least partially on the impedance of the power grid. The gain parameter controls at least one of a magnitude of reactive current provided to power grid 30 and a rate of increase of the reactive current provided to power grid 30.

Furthermore, method 210 may also include determining 222 when conversion device 16 can perform the impedance meter function without negatively effecting operation of power conversion system 14. For example, system controller 18 may determine 222 that power grid 30 is strong enough (i.e., the impedance of power grid 30 is low enough) that varying 212 the reactive current applied to power grid 30 will not cause the voltage at first point of interconnection 50 to exceed a predefined trip voltage.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Described herein are exemplary methods, systems, and computer readable media for closed-loop control of a power conversion system. The methods, systems, and computer readable media described herein facilitate regulating at least one of a magnitude of reactive power output by a conversion device and provided to the power grid and a rate of increase of the reactive power based at least partially on a strength of the power grid. The methods, systems, and computer readable media described herein also facilitate determining when the power grid strength is high enough to determine the impedance of the power grid without negatively effecting operation of the power conversion system. Furthermore, an impedance meter function is performed as often as possible in order to base the current regulation determinations on recent grid impedance measurements.

The methods, systems, and computer readable media described herein facilitate efficient and economical control of a power conversion system. Exemplary embodiments of methods, systems, and computer readable media are described and/or illustrated herein in detail. The methods, systems, and computer readable media are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system configured to provide alternating current (AC) power to a transformer, wherein the transformer comprises a transformer input coupled to said power conversion system and a transformer output coupled to a power grid, said power conversion system comprising:
a power conversion device comprising a device input and a device output, said power conversion device configured to receive power from a power source at said device input, said device output configured for coupling to the transformer input;
at least one sensor coupled at a first point of interconnection between said device output and the transformer input and configured to measure a voltage level at the first point of interconnection; and
a system controller communicatively coupled to said power conversion device and said at least one sensor and configured to vary a reactive power of said power conversion device, determine an impedance of the power grid based at least partially on a change in the voltage level at the first point of interconnection caused by the varied reactive power, determine when determining the impedance of the power grid will not negatively affect operation of said power conversion system, and determine a gain parameter of said power conversion device based at least on the impedance of the power grid.

2. A power conversion system in accordance with claim 1, wherein said system controller is configured to determine the impedance of the power grid during operation of said power conversion system.

3. A power conversion system in accordance with claim 1, wherein said system controller is further configured to control operation of said power conversion device based at least partially on the impedance of the power grid.

4. A power conversion system in accordance with claim 1, wherein said system controller is configured to determine the impedance of the power grid by measuring changes in the voltage level at the first point of interconnection after an increase or decrease in power provided to said power conversion system exceeds a predefined level.

5. A power conversion system in accordance with claim 1, wherein said system controller is configured to determine a strength of the power grid based on the impedance of the power grid.

6. A power conversion system in accordance with claim 1, further comprising, a memory coupled to or included within said system controller and configured to store an equivalent power system model that includes a grid impedance parameter, and wherein said system controller is configured to estimate the voltage level at the transformer output based at least partially on the impedance of the power grid and the equivalent power system model.

7. A power conversion system in accordance with claim 6, wherein the gain parameter controls at least one of a magnitude of reactive power provided to the power grid and a rate of increase of reactive power provided to the power grid.

8. A power conversion system in accordance with claim 6, wherein said memory is further configured to store one or more gain parameters and one or more associated timestamps to facilitate at least one of monitoring changes in the one or more gain parameters over time and providing a baseline value to apply to current operation that was determined as suitable at a similar date and/or time in the past.

9. A power generation system, comprising:
a power source;
a power conversion device comprising a device input and a device output, wherein said device input is coupled to said power source;
a transformer comprising a transformer input and a transformer output, wherein said transformer input is coupled to said device output at a first point of interconnection and wherein said transformer output is coupled to a power grid at a second point of interconnection;
at least one sensor positioned between said power conversion device and said transformer and configured to measure a voltage level at the first point of interconnection; and
a system controller coupled to said power conversion device and said at least one sensor and configured to vary a reactive power of said power conversion device, determine an impedance of the power grid based at least partially on a change in the voltage level at the first point of interconnection caused by the varied reactive power, determine when determining the impedance of the power grid will not negatively affect operation of said power generation system, and determine a gain parameter of said power conversion device based at least on the impedance of the power grid.

10. A system in accordance with claim 9, wherein said system controller further comprises a memory configured to store an equivalent power system model that includes a grid impedance parameter, and wherein said system controller is configured to estimate the voltage level at the second point of interconnection based at least partially on the impedance of the power grid and the equivalent power system model.

11. A system in accordance with claim 10, wherein said memory is further configured to store a power conversion device control algorithm that includes the gain parameter that controls at least one of a magnitude of reactive power provided to the power grid and a rate of increase of reactive power provided to the power grid.

12. A system in accordance with claim 11, wherein said system controller is configured to determine the gain parameter during operation of said power generation system based at least partially on the impedance of the power grid.

13. A method for controlling operation of a power conversion device included within a power conversion system, wherein a power source provides power to the device which provides power to a transformer at a first point of interconnection, and wherein the transformer is coupled to the power grid at a second point of interconnection, and wherein at least one sensor is coupled between the device and the transformer, said method comprising:
varying a reactive current output of the power conversion device;
receiving a sensor signal from the at least one sensor, wherein the sensor signal includes data associated with a voltage level at the first point of interconnection;
determining an impedance of the power grid at the second point of interconnection based at least partially on a change in the voltage level in response to the varied reactive current;
determining when determining the impedance of the power grid will not negatively affect operation of said power conversion device;
determining a gain parameter of said power conversion device based at least on the impedance of the power grid; and
controlling operation of said power conversion device based on at least one of the gain parameter and the impedance of the power grid.

14. A method in accordance with claim 13, wherein determining the impedance of the power grid comprises determining the impedance during operation of said power conversion system.

15. A method in accordance with claim 13, wherein determining when determining the impedance of the power grid will not negatively affect operation of the power conversion system further comprises determining when the power grid is strong enough that varying the reactive current will not cause the voltage level at the first point of interconnect to exceed a predefined trip voltage.

* * * * *

UNITED STATES PATENT AND TRADEMARK OFFICE
CERTIFICATE OF CORRECTION

| | |
|---|---|
| PATENT NO. | : 8,787,052 B2 |
| APPLICATION NO. | : 13/324436 |
| DATED | : July 22, 2014 |
| INVENTOR(S) | : O'Brien et al. |

It is certified that error appears in the above-identified patent and that said Letters Patent is hereby corrected as shown below:

In the Specification

In Column 4, Line 32, delete "system controller 64." and insert -- system controller 18. --, therefor.

Signed and Sealed this
Twenty-fifth Day of November, 2014

Michelle K. Lee
*Deputy Director of the United States Patent and Trademark Office*